US012360008B2

(12) United States Patent
Hu et al.

(10) Patent No.: US 12,360,008 B2
(45) Date of Patent: Jul. 15, 2025

(54) METHOD AND DEVICE FOR FAULT DIAGNOSIS OF WIND TURBINE PITCH BEARING BASED ON NEURAL NETWORK

(71) Applicant: ZHEJIANG UNIVERSITY, Zhejiang (CN)

(72) Inventors: Weifei Hu, Hangzhou (CN); Feng Tang, Hangzhou (CN); Yaxuan Zhang, Hangzhou (CN); Zhenyu Liu, Hangzhou (CN); Jianrong Tan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 344 days.

(21) Appl. No.: 18/073,534

(22) Filed: Dec. 1, 2022

(65) Prior Publication Data
US 2023/0273093 A1 Aug. 31, 2023

(30) Foreign Application Priority Data
Feb. 28, 2022 (CN) .......................... 202210183631.6

(51) Int. Cl.
G01M 13/045 (2019.01)
F03D 17/00 (2016.01)
G06N 3/08 (2023.01)

(52) U.S. Cl.
CPC ........... *G01M 13/045* (2013.01); *F03D 17/00* (2016.05); *G06N 3/08* (2013.01); *F05B 2260/80* (2013.01)

(58) Field of Classification Search
CPC ........ G01M 13/045; F03D 17/00; G06N 3/08; F05B 2260/80
See application file for complete search history.

(56) References Cited

U.S. PATENT DOCUMENTS

2009/0295159 A1* 12/2009 Johnson ............... G05B 13/024
290/44
2010/0098540 A1* 4/2010 Fric ......................... F03D 7/043
416/1
(Continued)

FOREIGN PATENT DOCUMENTS

CN 2890860 Y 4/2007
CN 107220469 A 9/2017
(Continued)

OTHER PUBLICATIONS

Notice of Allowance(202210183631.6); Date of Mailing: Apr. 13, 2022.
(Continued)

Primary Examiner — Arleen M Vazquez
Assistant Examiner — Lyudmila Zaykova-Feldman
(74) Attorney, Agent, or Firm — Wiersch Law Group

(57) ABSTRACT

A method and a device for fault diagnosis of wind turbine pitch bearing based on neural network, the method includes: measuring the signal strength at different points of a sensor and different rolling angles, determining an optimal measurement rolling angle of a blade and sensor point arrangement, blocking the blade at the optimal rolling angle to collect the pitch vibration data, further processing the collected vibration data into a dataset, constructing a neural network model, using the collected dataset to train the network, and deploying the trained network to PLC for real-time dynamic monitoring of the wind turbine; the device includes the vibration acceleration sensors, a vibration data acquisition card and a programmable logic controller (PLC). The present disclosure can realize the fast, real-time and accurate monitoring of the health status of the pitch bearing.

9 Claims, 5 Drawing Sheets

(56) References Cited

U.S. PATENT DOCUMENTS

| | | | | |
|---|---|---|---|---|
| 2010/0209243 | A1* | 8/2010 | Birkemose | F03D 17/00 |
| | | | | 416/61 |
| 2012/0257967 | A1* | 10/2012 | Egedal | F03D 7/0224 |
| | | | | 416/1 |
| 2015/0093246 | A1* | 4/2015 | Lee | F03D 7/0224 |
| | | | | 416/147 |
| 2015/0369698 | A1* | 12/2015 | Sakaguchi | G01M 13/04 |
| | | | | 702/56 |
| 2017/0328349 | A1* | 11/2017 | Pan | F03D 80/70 |
| 2019/0211805 | A1* | 7/2019 | Elmose | F03D 17/00 |
| 2019/0219032 | A1* | 7/2019 | He | G01M 13/04 |
| 2021/0108988 | A1* | 4/2021 | Qiao | G01M 13/045 |
| 2021/0332800 | A1 | 10/2021 | Guo et al. | |

FOREIGN PATENT DOCUMENTS

| | | | |
|---|---|---|---|
| CN | 107560849 | A | 1/2018 |
| CN | 111562094 | A | 8/2020 |
| CN | 111931625 | A | 11/2020 |
| CN | 112924173 | A | 6/2021 |
| CN | 113468728 | A | 10/2021 |
| CN | 114048688 | A | 2/2022 |
| IN | 2018036094 | A | 1/2019 |
| WO | 2018209655 | A1 | 11/2018 |

OTHER PUBLICATIONS

Prediction-of-remaining-useful-life-of-multi-stage-aero-engine-based-on-clustering-and-LSTM-fusion.
Early-warning-method-of-wind-turbine-pitch-bearing-wear.

* cited by examiner

METHOD AND DEVICE FOR FAULT DIAGNOSIS OF WIND TURBINE PITCH BEARING BASED ON NEURAL NETWORK

CROSS-REFERENCE TO RELATED APPLICATIONS

The present application claims priority to Chinese Patent Application No. 202210183631.6, filed on Feb. 28, 2022, the content of which is incorporated herein by reference in its entirety.

TECHNICAL FIELD

The present disclosure relates to the technical field of wind power generation and the technical field of bearing fault diagnosis and in particular, to a method and a device for fault diagnosis of a wind turbine pitch bearing based on a neural network.

BACKGROUND

During the wind turbine operation, the pitch bearing is an essential supporting component for the adjustment angle of the wind turbine blade. When the pitch bearing is working, various components within the pitch bearing are subjected to extrusion pressure and mutual wear, resulting in the working state of the pitch bearing constantly changing, and the change will lead to the failure of the pitch bearing. Due to the high requirement for precision, high failure rate, and high repair cost of wind turbine pitch bearings, the diagnosis and detection of pitch bearings is one of the most significant aspects of the wind turbine industry.

Conventional wind turbine pitch bearing fault diagnosis method are mainly based on time domain, frequency domain, and time-frequency domain methods with the following problems: (1) due to the extremely slow rotation speed of the pitch bearing, the fault signal is too weak to be easily submerged into a large amount of noise, making it difficult to extract the characteristic frequency band of the faulty bearings by traditional analysis methods; (2) analyzing the fault information based on time/frequency domain characteristic amplitude or characteristic frequency requires a lot of prior knowledge, which causes great problems for use and maintenance in real application scenarios; and (3) using the traditional time/frequency domain analysis method preprocesses the original data through many transformations, resulting in a relatively large amount of calculation and a cumbersome calculation process, which lead to a slow calculation speed. Therefore, those skilled in the art are devoted to developing an efficient and reliable method for fault diagnosis of wind turbine pitch bearings.

Deep learning is an important part of machine learning. Through deep learning, a nonlinear model will be constructed based on input data and labels so that the weak correlation in input data can be expressed. At present, the popular deep learning algorithms include convolutional neural network (CNN), recurrent neural network (RNN), and long short-term memory (LSTM). Among them, convolutional neural network is suitable for processing image-related information and has been widely used in related fields; RNN and LSTM are ideal for analyzing time series data, where LSTM network shows excellent analysis performance for long sequence data.

From the principle, neural networks are able to save the prior knowledge in the trained network model. In another word, no matter how complex background knowledge is, neural networks are likely to construct a non-linear mapping relationship between the input data and the output. Since the neural networks require a large amount of data to train the model, they usually have a good performance to extract weak features hidden in a high-level noise. Hence, neural networks are a promising solution to diagnosis of wind turbine pitch bearing.

SUMMARY

In order to solve the problems of the existing technology, such as high requirements for the prior knowledge, low analysis efficiency for a large number of time-domain data, and low signal-to-noise ratio in the pitch process, the present disclosure adopt the following technical solution to improve the accuracy of fault diagnosis and analysis:

A method for fault diagnosis of a wind turbine pitch bearing based on neural network, including:

S1: Set sample rolling angles to collect vibration signals from a fixed point of a blade. Determine an optimal measurement rolling angle, and adjust the blade correspondingly.

S2: Set vibration measurement points on a pitch bearing.

S3: Lock the blade and adjust the pitch speed. Set the range of pitch angle, and obtain the vibration signal of the pitch bearing under different pitch speed.

S4: Divide the collected vibration signals into fault data and normal data according to health status of the pitch bearing. Label the fault data and the normal data, and construct a training dataset.

S5: Use the training dataset into a LSTM neural network for training, where the LSTM neural network includes a set of LSTM cells. The training dataset is divided into N parts, and fed into each LSTM cell in sequence. The output of the last LSTM cell is transmitted to a fully connected layer, and the output of the fully connected layer is activated by an activation function, then the loss of the network is calculated by comparing the predicted result with the real label.

Further, in step S1, the optimal measurement rolling angle is determined by collecting root mean square (RMS) values of the vibration signals at each point respectively and comparing the RMS values between the points, and taking a rolling angle with maximum RMS value as the optimal measurement rolling angle.

Further, in step S3, the pitch speed range includes a series of discrete pitch speed, and a measurement cycle represents that the pitch angle varies from the minimum angle to the maximum angle, and then backwards, within the pitch angle range at a fixed pitch speed.

Further, the vibration signals are the voltage values collected by single-axis acceleration sensors.

Further, in step S4, the collected time-domain vibration signals are normalized to eliminate the error caused by the range of vibration amplitude. Then the vibration data is denoised by wavelet threshold denoising method: (1) decompose the original time-domain vibration signals by 1-D wavelet decomposition algorithm into low-frequency components and high-frequency components. (2) Since the noisy data mostly occurs in the high-frequency band, the decomposed high-frequency components were suppressed by hard threshold processing method. (3) reconstruct the low-frequency components and the hard-threshold-processed high-frequency components into a denoised signal. Then the same sized fault data and normal data were packed into a dataset, and the data in the dataset were shuffled.

Further, in step S5, during the training phase of LSTM, the training data is processed as follows:

S51: Append the input data of current time step after the output of the previous time step.

S52: Add the concatenated data to a candidate value as:

$$\tilde{C}_t = \tanh(W_C \cdot [x_t, h_{t-1}] + b_C)$$

where $x_t$ represents the input data of the $t^{th}$ step, $h_{t-1}$ represents the output of the $t-1^{th}$ time step, $W_C$ represents the weight matrix, $b_C$ represents the bias matrix, $\tanh(\cdot)$ represents a hyperbolic tangent function, $\tilde{C}_t$ represents the candidate value.

S53: Pass the concatenated training data through a forget gate, an input gate, and an output gate sequentially, where the forget gate is designed to remove values with weak correlation in cell state, the input gate is designed to add new content of the current time step to the network, and the output gate is constructed to determine the output data of the present time step; that is:

$$f_t = \sigma(W_f \cdot [x_t, h_{t-1}] + b_f)$$

$$i_t = \sigma(W_i \cdot [x_t, k_{t-1}] + b_i)$$

$$o_t = \sigma(W_o \cdot [x_t, h_{t-1}] + b_o)$$

where $f_t$ represents the output of forget gate, $W_f$ represents the weight matrix of forget gate, $b_f$ represents the bias matrix of forget gate; $i_t$ represents the output of input gate, $W_i$ represents the weight matrix of input gate, $b_i$ represents the bias matrix of input gate; $o_t$ represents the output of output gate, $W_o$ represents the weight matrix of output gate, $b_o$ represents the bias matrix of output gate; $\sigma(\cdot)$ represents a sigmoid activation function.

S54: Multiply the output of the forget gate with the cell state of the previous time step. Multiply the output of the input gate with the candidate value in the current time step to obtain an updated cell state of the current time step; In other words, the network's memory, which is the cell state $C_t$, is updated using the forget gate and the input gate data:

$$C_t = f_t * C_{t-1} + \tilde{C}_t * i_t$$

S55: Filter the cell state using the output gate and output the data of the current time step.

$$h_t = o_t * \tanh(C_t)$$

Further, the output of the last LSTM cell is transmitted to a two-layered fully connected network classifier with the number of neurons in the first layer as 20 and the second layer as 2 and then activated by an activation function:

$$O_1 = a(W_1 \cdot O_f + b_1)$$

$$O_2 = \sigma(W_2 \cdot O_1 + b_2)$$

where $O_f$ represents the output of the last LSTM layer, $W_1$ represents the weight matrix of the first fully connected layer, $b_1$ represents the bias matrix of the first fully connected layer, $O_1$ represents the output of the first fully connected layer; $W_2$ represents the weight matrix of the second fully connected layer, $b_2$ represents the bias matrix of the second fully connected layer, $O_2$ represents the output of the second fully connected layer; $a(\cdot)$ and $\sigma(\cdot)$ represent the activation function.

$$\sigma(z) = \frac{1}{1 + e^{-z}}$$

where z represents a received input, which can be a single value or a matrix.

The device for fault diagnosis of wind turbine pitch bearing based on neural network includes a single-axis vibration sensor, a vibration data acquisition card and a programmable logic controller (PLC). The vibration sensor is connected with the pitch bearing and the vibration data acquisition card, and the vibration data acquisition card is connected to the PLC.

The vibration sensor is utilized to obtain the vibration signals of the pitch bearing in the pitching process with different pitching speed.

The vibration data acquisition card samples at intervals on the basis of the sampling interval set according to the sampling frequency.

The programmable logic controller is programmed with a trained LSTM neural network model programmed by C++. The acquisition system and the programmed PLC are deployed inside the actual wind turbine. Once the pitch starts, the real-time vibration data is collected by the vibration sensor and the data acquisition card and then transmitted to the PLC for fault diagnosis.

Further, the vibration sensor includes the general-purpose vibration acceleration sensors and the low-frequency vibration acceleration sensors. The optimal measurement rolling angle is determined by the maximum RMS value of the vibration acceleration signals, to which the blade is adjusted to before diagnosis.

Further, the vibration sensor is recommended to be set in the bearing area of the pitch bearing, so as to obtain a stronger signal. Alternatively, the vibration sensor can be located at the outer ring of the pitch bearing. If such points are not available, the vibration sensor could be set at the hub close to the inner ring. The measuring point on the hub is at the position where the highest cross-correlation coefficient between the hub and the outer ring of pitch bearing is calculated.

The advantages and beneficial effects of the present disclosure are as follows:

(1) The fault diagnosis of the wind turbine pitch bearing based on LSTM neural network according to the present disclosure uses a large amount of collected vibration data to train a neural network model, which avoids deep expert knowledge required for traditional pitch bearing fault analysis, and reduces the skill requirements for the wind power operation and maintenance staff, and is able to achieve automated maintenance of wind turbine.

(2) The fault diagnosis of the wind turbine pitch bearing based on long short-term memory neural network according to the present disclosure can analyze weak fault information under a large amount of noisy data by the constructed LSTM network, which is suitable for the situation where the pitch bearing rotates at a low speed during the blade pitching process.

(3) The fault diagnosis of the wind turbine pitch bearing based on long short-term memory neural network according to the present disclosure avoids a large amount of time/frequency domain transformation calculations in the traditional algorithm, simplifying the calculation process and improving the analysis efficiency, so that the real-time condition monitoring of the pitch bearing can be realized.

DESCRIPTION OF EMBODIMENTS

The embodiments of the present disclosure are described in detail below with reference to the drawings. It should be understood that the embodiments described herein are only used to illustrate and explain the present disclosure, but not to limit the present disclosure.

Figure 1:
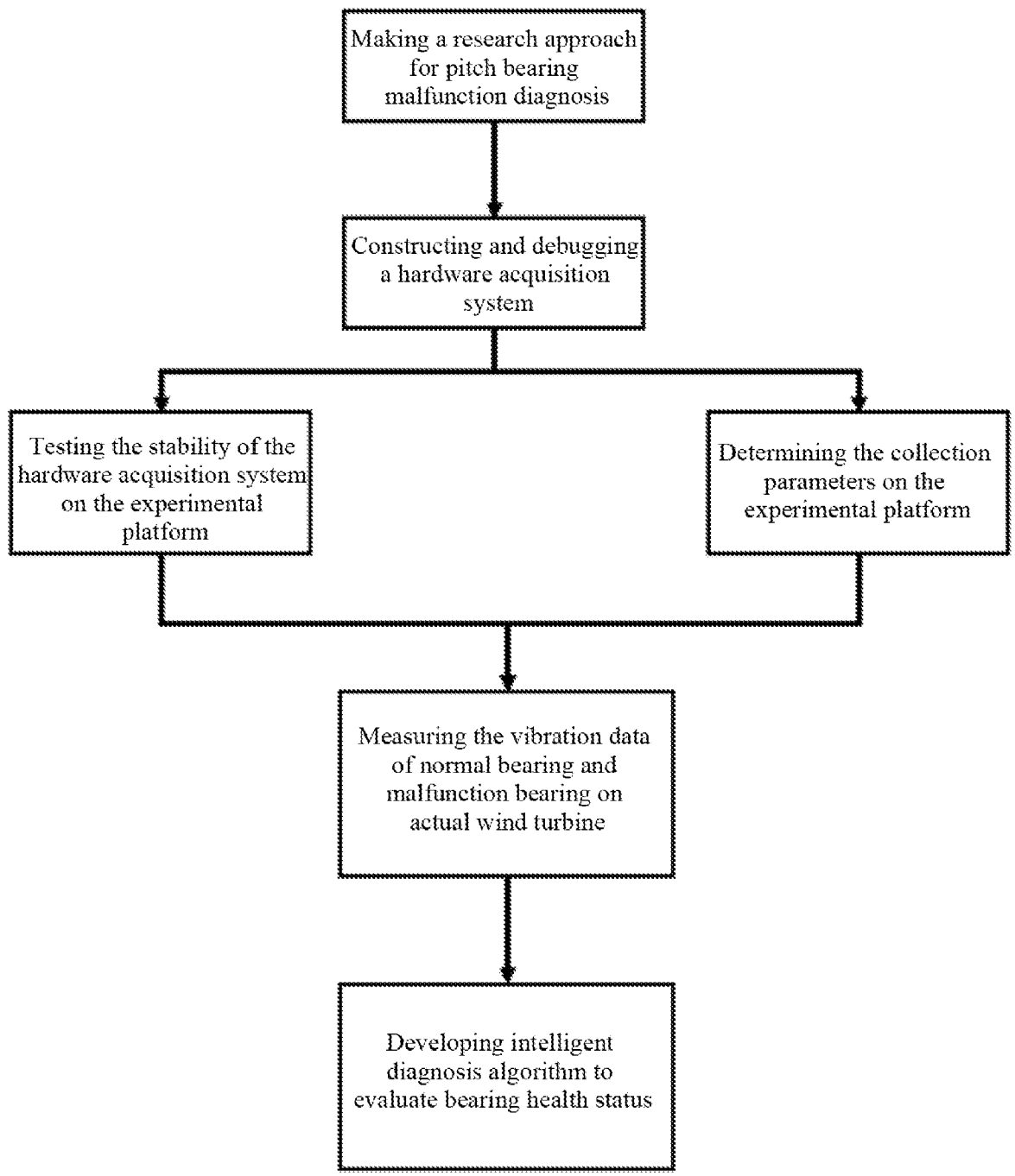
FIG. 1 is a flowchart of an overall operation according to an embodiment of the present disclosure.
Figure 2:
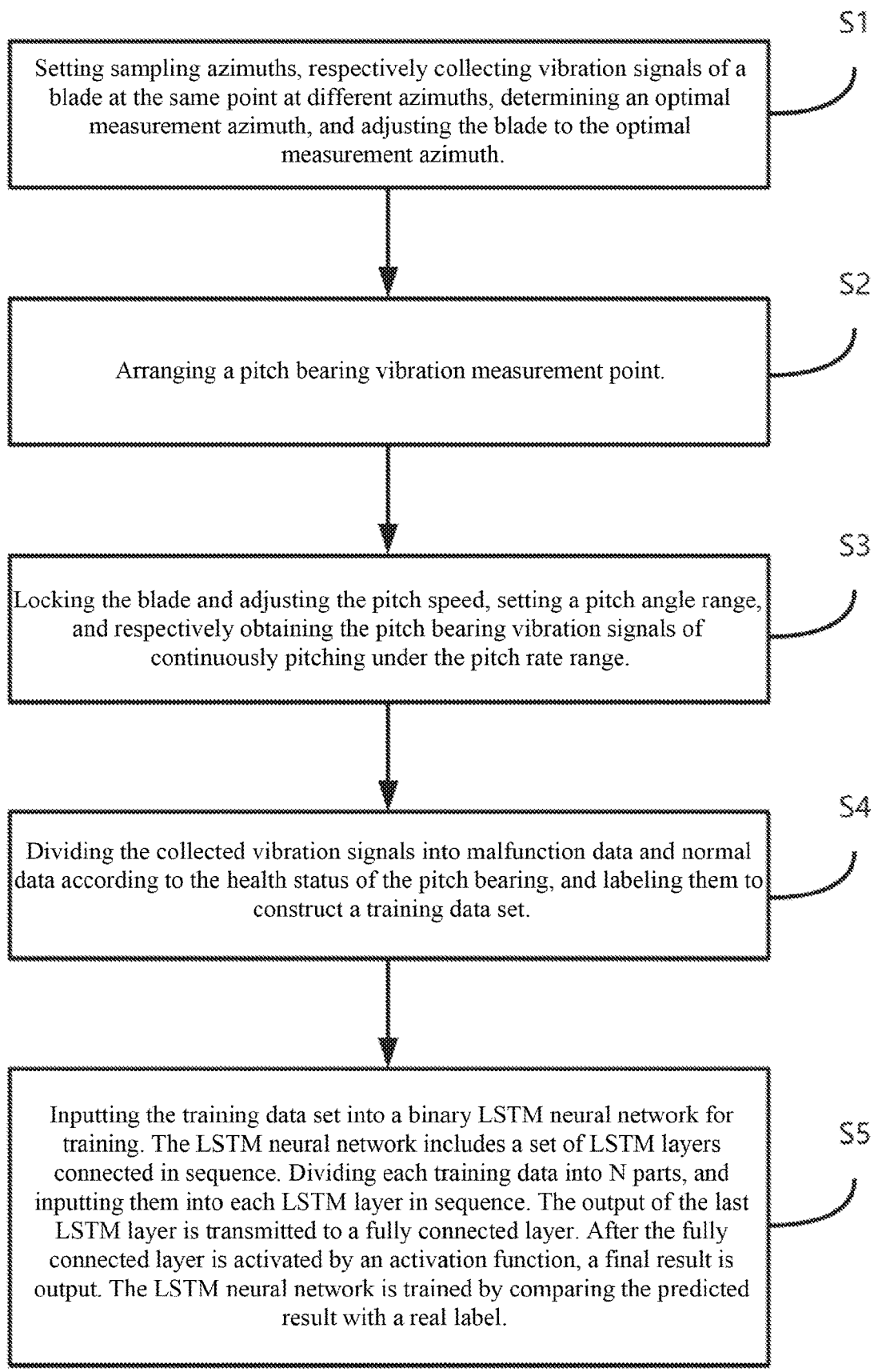
FIG. 2 is a flowchart of the method according to an embodiment of the present disclosure.

A method for fault diagnosis of wind turbine pitch bearing based on neural network, including the following steps:

As shown in FIG. 1 and FIG. 2, the method for fault diagnosis of wind turbine pitch bearing based on neural network, including:

S1: A series of sample rolling angles were set to collect vibration signals, select an optimal measurement rolling angle, then adjust the blade to the optimal measurement rolling angle.

The optimal measurement rolling angle was determined by the RMS values of collected vibration signals from different rolling angles. Compare the RMS values and select the rolling angle with the maximum RMS value as the optimal measurement rolling angle.

Sample a vibration signal for every 60° of rolling angle. Then the RMS values of the signals sampled by general-purpose sensors and the low-frequency sensors were calculated, both RMS values of the general-purpose sensors and low-frequency sensors were compared respectively. The rolling angle with the maximum RMS value was selected as the optimal measurement rolling angle. Finally, the roll of the blade was adjusted to a to be measured.

S2: Set vibration measurement points on a pitch bearing.

S3: Lock the blade and adjust the pitch speed. Set the range of pitch angle, and obtain the vibration signal of the pitch bearing under different pitch speed;

The range of pitch speed includes a series of discrete pitch speeds, and a measurement cycle represents that the pitch angle varies from the minimum angle to the maximum angle, and then backwards, within the pitch angle range at a fixed pitch speed.

In an embodiment, the blade was blocked at the optimal rolling angle, and the pitch angle was set at 0°-90°, and the pitch speed is within the range of 1°/s to 5°/s. Each measurement cycle represents that the pitch angle varies from 90° to 0°, and then backwards.

S4: Divide the collected vibration signals into fault data and normal data according to health status of the pitch bearing. Label the fault data and the normal data, and construct a training dataset.

Normalize the collected time-domain vibration signals to eliminate the error caused by the range of vibration amplitude. Then denoise the vibration data by wavelet threshold denoising method: (1) decompose the original time-domain vibration signals by 1-D wavelet decomposition algorithm into low-frequency components and high-frequency components. (2) Since the noisy data mostly occurs in the high-frequency band, the decomposed high-frequency components were suppressed by hard threshold processing method. (3) reconstruct the low-frequency components and the hard-threshold-processed high-frequency components into a denoised signal. Then the same sized fault data and normal data were packed into a dataset, and the data in the dataset were shuffled.

Figure 3:
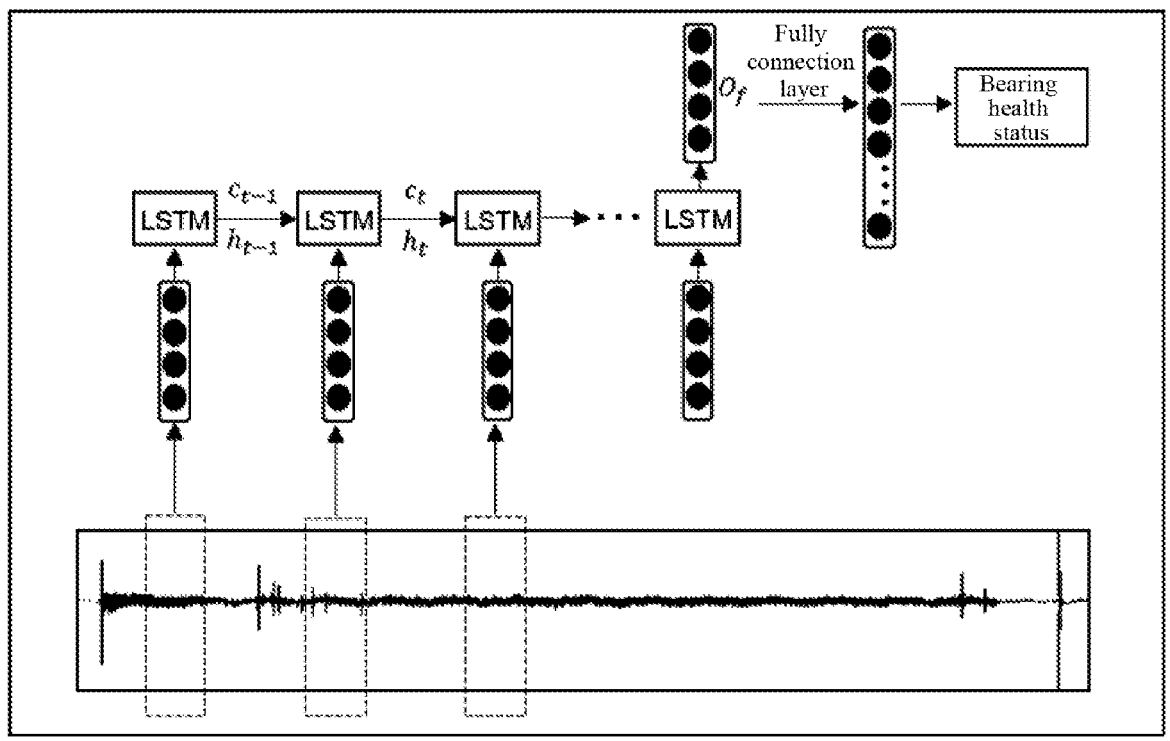
FIG. 3 is a diagram of an LSTM neural network model framework according to an embodiment of the present disclosure.

S5: as is shown in FIG. 3, the training dataset was fed to a LSTM neural network for training, where the LSTM neural network included a set of LSTM cells. The training dataset was divided into N parts, and fed into each LSTM cell in sequence. The output of the last LSTM cell was transmitted to a fully connected layer, and the output of the fully connected layer is activated by an activation function, then the loss of the network is calculated by comparing the predicted result with the real label.

80% of the data in the dataset was used to train the network, and the remaining 20% was used to test the performance of the network. Each training data was divided into 50 parts.

Figure 4:
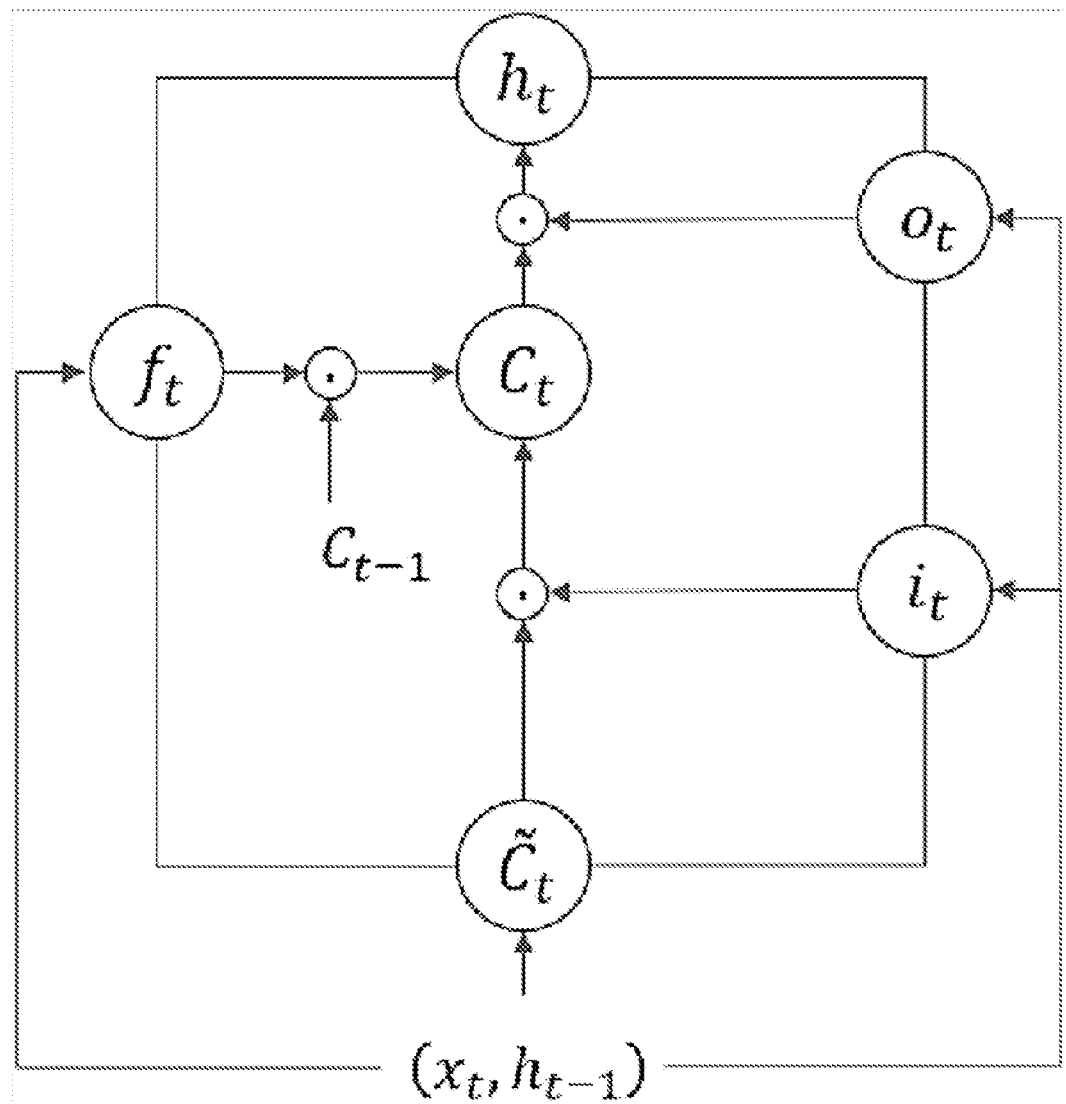
FIG. 4 is a flowchart of the LSTM layer processing the training data in the time step according to an embodiment of the present disclosure.

$D \in R^{batch, F_s \times T_s}$, where D represents the training dataset, $F_s$ represents the $S^{th}$ sampling frequency, $T_s$ represents the $S^{th}$ sampling duration, $S \in \{1, 2, 3, \ldots, k\}$ represents a specific sampling process, and the specific implementation process thereof is shown in FIG. 4. After the training data was segmented and input into the LSTM neural network in time series, the training data was processed as followings in one specific time step:

S51, the input data of the current time step and the output of the previous time step was concatenated.

S52, the concatenated training data was added to the candidate values, that is:

$$\tilde{C}_t = \tanh(W_C \cdot [x_t, h_{t-1}] + b_C)$$

where $x_t$ represents the input data of the $t^{th}$ step, $h_{t-1}$ represents the output of the $t-1^{th}$ time step, $W_C$ represents the weight matrix, $b_C$ represents the bias matrix, $\tanh(\bullet)$ represents a hyperbolic tangent function, $\tilde{C}_t$ represents the candidate value.

S53, the concatenated training data was passed through a forget gate, an input gate and an output gate in sequence. The forget gate was used to remove the values with weak correlation in the cell state, the input gate was used to add the new content of the current time step to the network, and the output gate was used to determine the output data of the current time step; that is:

$$f_t = \sigma(W_f \cdot [x_t, h_{t-1}] + b_f)$$

$$i_t = \sigma(W_i \cdot [x_t, k_{t-1}] + b_i)$$

$$o_t = \sigma(W_o \cdot [x_t, h_{t-1}] + b_o)$$

where $f_t$ represents the output of forget gate, $W_f$ represents the weight matrix of forget gate, $b_f$ represents the bias matrix of forget gate; $i_t$ represents the output of input gate, $W_i$ represents the weight matrix of input gate, $b_i$ represents the bias matrix of input gate; $o_t$ represents the output of output gate, $W_o$ represents the weight matrix of output gate, $b_o$ represents the bias matrix of output gate; $\sigma(\bullet)$ represents a sigmoid activation function.

S54, the output of forget gate was combined with the cell state of the previous time step, and the output of the input gate was combined with the candidate value of the time step to update the cell state in the current time step:

$$C_t = f_t * C_{t-1} + \tilde{C}_t * i_t$$

S55, the output gate was used to filter the cell state and output the data of the current time step.

$h_t = o_t * \tanh(C_t)$

After the processes of the last time step were completed, the output of the last LSTM cell was transmitted to a two-layered fully connected network classifier. The number of neurons in the first layer is 20, and the number of neurons in the second layer is 2, that is:

$O_1 = a(W_1 \cdot O_f + b_1)$ $O_2 = \sigma(W_2 \cdot O_1 + b_2)$ where $O_f$ represents the output of the last LSTM layer, $W_1$ represents the weight matrix of the first fully connected layer, $b_1$ represents the bias matrix of the first fully connected layer, $O_1$ represents the output of the first fully connected layer; $W_2$ represents the weight matrix of the second fully connected layer, $b_2$ represents the bias matrix of the second fully connected layer, $O_2$ represents the output of the second fully connected layer; $a(\cdot)$ and $\sigma(\cdot)$ represent the activation function. Where, $$\sigma(z) = \frac{1}{1+e^{-z}}$$

where z represents the received input, which can be a single value or a matrix.

Figure 5:
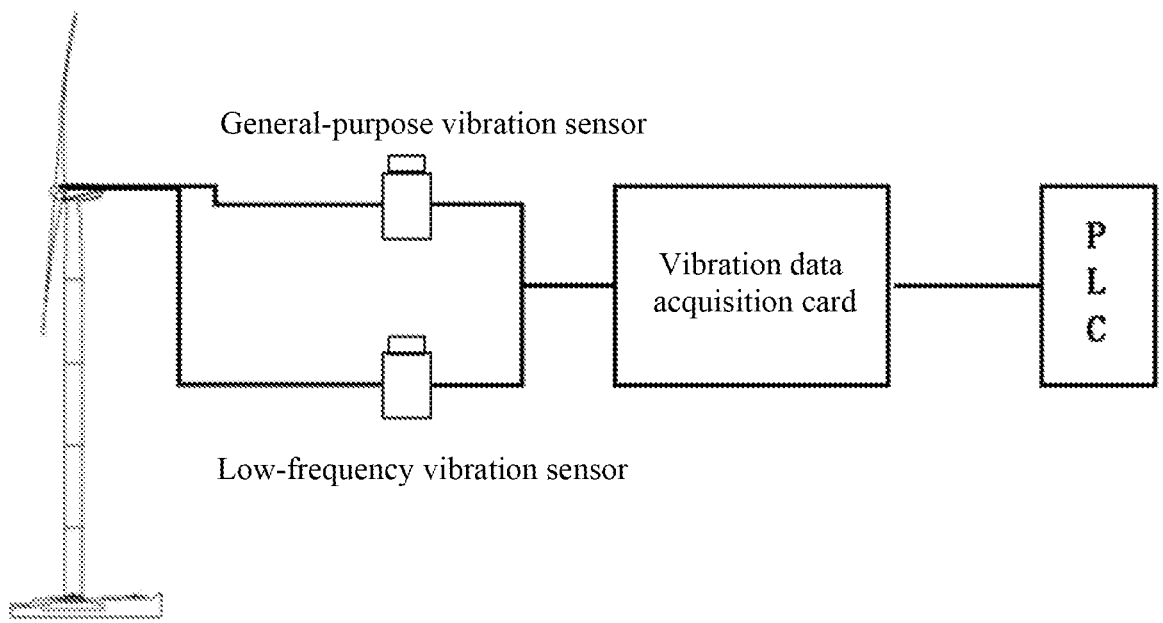
FIG. 5 is a schematic diagram of hardware connection according the embodiment of the present disclosure.

As shown in FIG. 5, the device for fault diagnosis of wind turbine pitch bearing based on neural network included the vibration sensors, a vibration data acquisition card and a programmable logic controller (PLC). The vibration sensors were connected with the pitch bearing and the vibration data acquisition card, and the vibration data acquisition card was connected to the programmable logic controller.

The vibration sensors included the general-purpose vibration acceleration sensors and the low-frequency vibration acceleration sensors. The optimal measurement rolling angle was determined by the RMS values of vibration signals at different sampling rolling angles, and the blade was adjusted to the optimal measurement rolling angle.

The vibration sensor was set in the supporting region of the pitch bearing to obtain a stronger signal.

Figure 6:
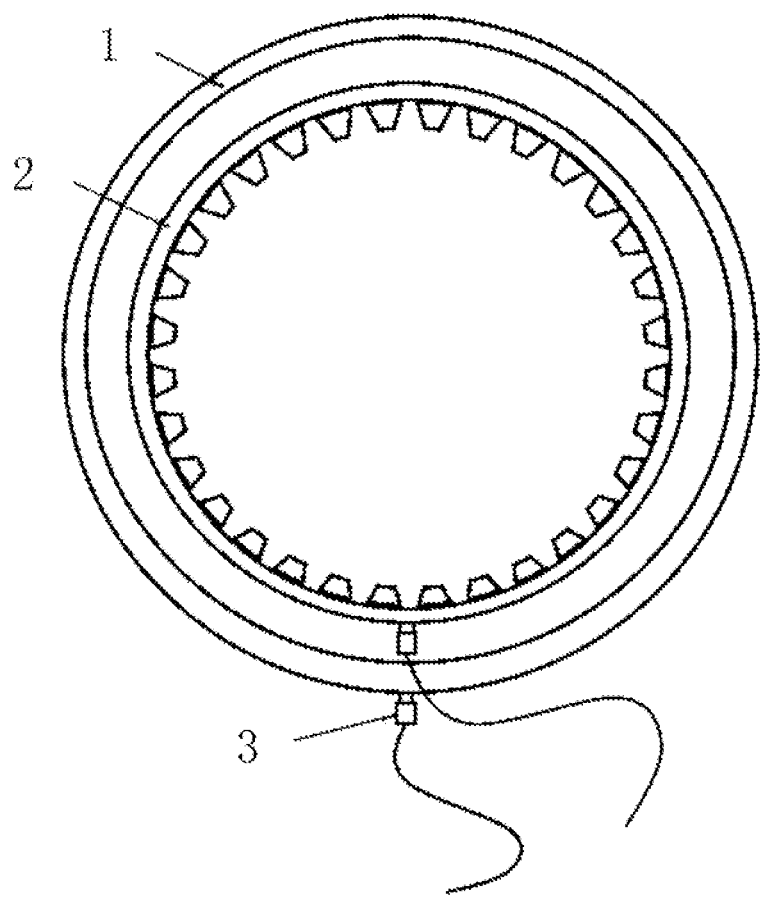
FIG. 6 is a schematic diagram of a point of the vibration acceleration according to the embodiment of the present disclosure.

As shown in FIG. 6, the vibration sensor 3 was placed at the outer ring 1 of the pitch bearing. If the position on the outer ring was not available because of the structural constraints, the vibration sensors could be placed on the hub where close to the inner ring. The measuring point on the hub was at the positions among which the highest cross-correlation coefficient between the hub and the outer ring was calculated.

The vibration data acquisition card samples at intervals based on the sampling interval set according to the sampling frequency.

The programmable logic controller was programmed with a trained LSTM neural network model programmed by C++. The acquisition system and the programmed PLC were deployed inside the actual wind turbine, and after the pitch rotor working, the real-time vibration data was collected by the vibration sensor 3 and the data acquisition card, and then transmitted to the PLC for fault diagnosis.

The above embodiments are only used to illustrate the technical solutions of the present disclosure, but not to limit them; although the present disclosure has been described in detail with reference to the foregoing embodiments, those skilled in the art should understand that they can still amend the technical solutions described in the foregoing embodiments, or perform equivalent replacements on some or all of the technical features; and these amendments or replacements do not make the essence of the corresponding technical solutions depart from the scope of the technical solutions according to the embodiments of the present disclosure.

What is claimed is:

1. A method for fault diagnosis of wind turbine pitch bearing based on neural network, comprising:
   S1: setting, by a low-frequency vibration acceleration sensor and a general-purpose vibration acceleration sensor, sample rolling angles to collect vibration signals from a fixed point of a blade, determining an optimal measurement rolling angle, and adjusting the blade correspondingly,
   wherein said determining the optimal measurement rolling angle comprises:
   calculating root mean square (RMS) values of the vibration signals at each test rolling angle, respectively, comparing the RMS values between the same measurement points, and taking a rolling angle with the maximum RMS value as the optimal measurement rolling angle;
   S2: setting vibration measurement points on the pitch bearing;
   S3: blocking the blade and adjusting a pitch speed, setting the range of pitch angle, and obtaining, by a vibration sensor and a vibration data acquisition card, the vibration signals of the pitch bearing under the different pitch speeds;
   S4: sampling, by the vibration data acquisition card, collected vibration signals at intervals, and normalizing and performing wavelet threshold noise reduction on the sampled signals by a programmable logic controller, dividing the collected vibration signals into fault data and normal data according to health status of the pitch bearing, labelling the fault data and the normal data, and constructing a training dataset;
   S5: inputting the training dataset into a Long Short-Term Memory (LSTM) neural network for training, wherein the LSTM neural network includes a set of LSTM cells, segmenting the training dataset into N parts, and feeding into each LSTM cell in sequence, transmitting the output of the last LSTM cell to a fully connected layer, activating the output of the fully connected layer by an activation function, and then calculating the loss of the network by comparing a predicted result with a real label; deploy trained LSTM neural network in a programmable logic controller of the wind turbine, collecting, by the vibration sensor and the vibration data acquisition card, the vibration signals of the wind turbine pitch bearing in real time, inputting the collected signals into the LSTM neural network in the programmable logic controller, and outputting a health status diagnosis result of the wind turbine pitch bearing, maintaining the wind turbine pitch bearing and adjusting variable pitch parameters according to the health status diagnosis result, to obtain the wind turbine pitch bearing without faults.

2. The method for fault diagnosis of the wind turbine pitch bearing based on neural network according to claim 1, wherein the range of the pitch speed comprises discrete pitch speeds, and a measurement cycle represents that the pitch angle varies from a minimum angle to a maximum angle, and then backwards, within the pitch angle range at a fixed pitch speed.

3. The method for fault diagnosis of the wind turbine pitch bearing based on neural network according to claim 1, wherein the vibration signals are voltage values collected by single-axis acceleration sensors.

4. The method for fault diagnosis of the wind turbine pitch bearing based on neural network according to claim 1, wherein step S4 comprises:
normalizing collected time-domain vibration signals to eliminate the error caused by the range of vibration amplitude; and
denoising the vibration data by wavelet threshold denoising method comprising:
(1) decomposing the original time-domain vibration signals by 1-D wavelet decomposition algorithm into low-frequency components and high-frequency components;
(2) suppressing the decomposed high-frequency components by hard threshold processing method; and
(3) reconstructing the low-frequency components and the hard-threshold-processed high-frequency components into a denoised signal, packing the same sized fault data and normal data into a dataset, and shuffling the dataset.

5. The method for fault diagnosis of the wind turbine pitch bearing based on neural network according to claim 1, wherein in step S5, after segmenting and feeding the training data into the LSTM neural network in sequence, processing the training data of one time step comprises:
S51, appending input data of current time step after an output of the previous time step;
S52, adding the concatenated data to a candidate value;
S53, passing the concatenated training data through a forget gate, an input gate, and an output gate sequentially, wherein the forget gate is designed to remove values with weak correlation in cell state, the input gate is designed to add new content of the current time step to the network, and the output gate is constructed to determine the output data of the present time step;
S54, multiplying the output of the forget gate with the cell state of the previous time step, multiplying the output of the input gate with the candidate value in the current time step to obtain an updated cell state of the current time step, namely the network's memory; and
S55, filter the cell state using the output gate and output data of the current time step.

6. The method for fault diagnosis of the wind turbine pitch bearing based on neural network according to claim 5, after processing the training data in the LSTM layer, further comprising: transmitting the output of the last LSTM cell to a two-layered fully connected network classifier and then activating the output of the last LSTM cell by an activation function.

7. A device for fault diagnosis of wind turbine pitch bearing based on neural network, comprising: the single-axis acceleration sensors utilized to obtain the vibration signals of the pitch bearing, the vibration data acquisition card configured to sample at interval on the vibration signals, and the programmable logic controller programmed with the Long Short-Term Memory (LSTM) neural network model trained by the fault diagnosis method according to claim 1 for fault diagnosis, wherein the vibration sensors are connected with the pitch bearing and the vibration data acquisition card, respectively, and the vibration data acquisition card is connected to the programmable logic controller.

8. The device for fault diagnosis of the wind turbine pitch bearing based on neural network according to claim 7, wherein the vibration sensors comprise the general-purpose vibration acceleration sensors and the low-frequency vibration acceleration sensors and configured to: determine the optimal measurement rolling angle based on the RMS values of the vibration signals from different sample rolling angle, and adjust the blade to the optimal measurement rolling angle.

9. The device for fault diagnosis of the wind turbine pitch bearing based on neural network according to claim 7, wherein the vibration sensors are placed in a supporting region of the pitch bearing, and the vibration sensors are placed on the outer ring of the pitch bearing, when the positions on the outer ring are not available due to the structural constraints, the vibration sensors are placed at the hub close to the inner ring, and the measuring points on the hub at the positions among which the highest cross-correlation coefficient between the hub and the outer ring is calculated.

* * * * *